(12) United States Patent
Shimada (10) Patent No.: US 10,079,498 B2
(45) Date of Patent: Sep. 18, 2018

(54) CHARGING CIRCUIT, POWER MANAGEMENT CIRCUIT, AND ELECTRONIC DEVICE USING THE SAME

(71) Applicant: ROHM CO., LTD., Ukyo-ku, Kyoto (JP)

(72) Inventor: Kazuaki Shimada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 236 days.

(21) Appl. No.: 14/692,037

(22) Filed: Apr. 21, 2015

(65) Prior Publication Data

US 2015/0311735 A1    Oct. 29, 2015

(30) Foreign Application Priority Data

Apr. 25, 2014  (JP) ................. 2014-091617

(51) Int. Cl.
| | |
|---|---|
| H02J 7/00 | (2006.01) |
| H02H 3/087 | (2006.01) |
| H02H 3/20 | (2006.01) |
| H02H 7/18 | (2006.01) |

(52) U.S. Cl.
CPC ........... *H02J 7/0052* (2013.01); *H02H 3/087* (2013.01); *H02H 3/202* (2013.01); *H02H 7/18* (2013.01); *H02J 7/0077* (2013.01); *H02J 2007/0059* (2013.01)

(58) Field of Classification Search
CPC .................................................. H02J 7/0052
USPC ........................................................ 320/107
See application file for complete search history.

(56) References Cited

U.S. PATENT DOCUMENTS

| 7,402,986 B2* | 7/2008 | Frith ......................... H02J 1/08 307/86 |
| 8,189,305 B2* | 5/2012 | Newman ............... B60R 16/033 361/18 |
| 8,278,997 B1* | 10/2012 | Kim ......................... G06F 1/26 327/541 |
| 8,508,142 B2* | 8/2013 | Lin .................... H05B 33/0815 315/200 A |

(Continued)

FOREIGN PATENT DOCUMENTS

JP           2013128338 A      6/2013

*Primary Examiner* — Drew A Dunn
*Assistant Examiner* — Jerry D Robbins
(74) *Attorney, Agent, or Firm* — Cantor Colburn LLP (57) ABSTRACT

Charging circuit includes: DC input terminal; battery terminal; system terminal; first transistor; second transistor; gate controller for controlling turning on/off of first transistor; charging controller for controlling gate voltage of second transistor to control charging of secondary battery; overcurrent protection circuit for comparing an input current flowing in DC input terminal and first transistor with threshold current having multiple steps of values, and vary gate voltage such that on-resistance is increased when input current reaches threshold current; low-voltage detection circuit for comparing voltage at DC input terminal with predetermined threshold voltage, and decrease threshold current of overcurrent protection circuit by one step when voltage of DC input terminal is below predetermined threshold voltage; and DC power detecting unit for determining, when threshold current is at minimum value and voltage of DC input terminal is below threshold voltage, that DC power source is not connected to charging circuit.

12 Claims, 10 Drawing Sheets

(56) References Cited

U.S. PATENT DOCUMENTS 9,367,043 B2 * 6/2016 Baba ................. G04C 10/02
2011/0248670 A1 * 10/2011 Yamazaki ........... H01M 2/0212
320/107

* cited by examiner

CHARGING CIRCUIT, POWER MANAGEMENT CIRCUIT, AND ELECTRONIC DEVICE USING THE SAME

CROSS-REFERENCE TO RELATED APPLICATION

This application is based upon and claims the benefit of priority from Japanese Patent Application No. 2014-091617, filed on Apr. 25, 2014, the entire contents of which are incorporated herein by reference.

TECHNICAL FIELD

The present disclosure relates to a charging circuit for charging a secondary battery.

BACKGROUND

Battery-driven electronic devices such as mobile phones, tablet terminals, note-type personal computers (PCs), portable game devices, digital cameras, etc., include a secondary battery and a charging circuit for charging the secondary battery.

SUMMARY

Figure 1:
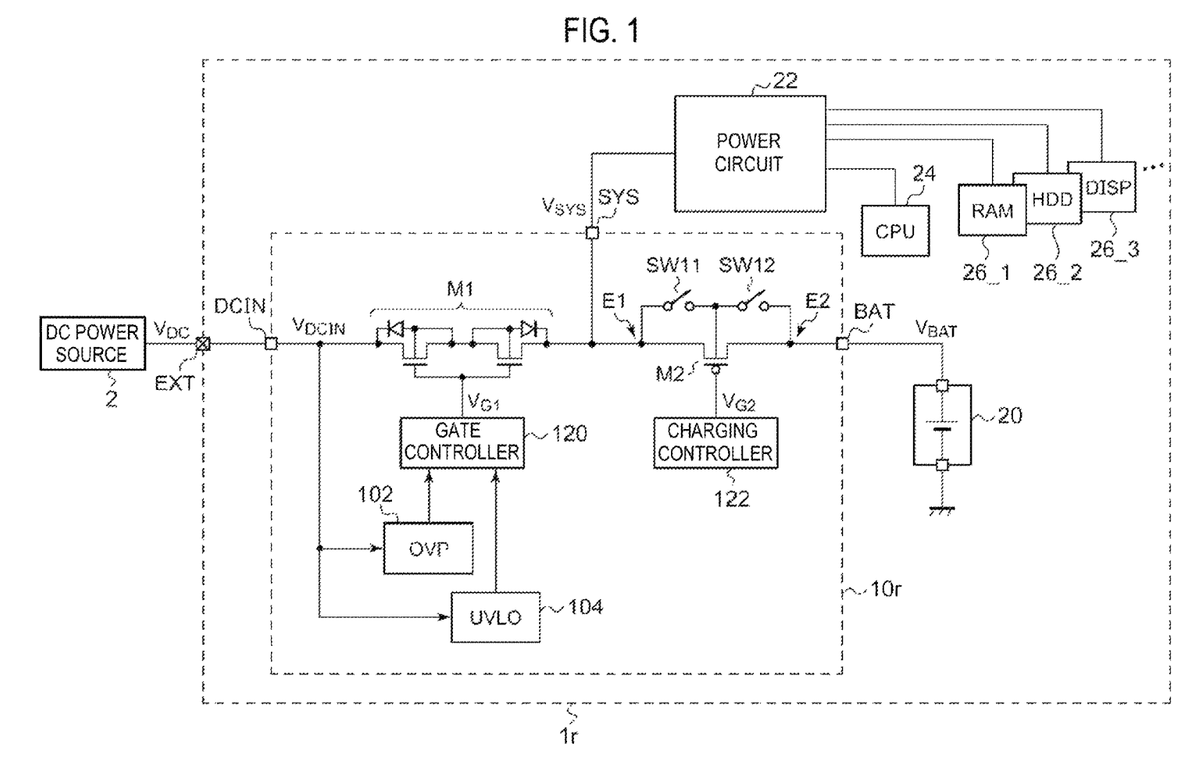
FIG. 1 is a circuit diagram of an electronic device.

FIG. 1 is a circuit diagram of an electronic device. The electronic device 1r includes a charging circuit 10r, a secondary battery 20, a power circuit 22, a CPU 24, and a plurality of peripheral circuits 26. The secondary battery 20 may be, for example, a lithium-ion battery, a nickel-hydrogen battery, etc. and outputs a battery voltage $V_{BAT}$.

The plurality of peripheral circuits 26 may include a memory such as a RAM 26_1 (Random Access Memory), a hard disk 26_2, a display 26_3, etc. A DC power source 2 such as an AC adaptor, a USB host, etc. is detachably connected to the external power terminal EXT of the electronic device 1r in order to supply a DC voltage $V_{DC}$ to the electronic device 1r.

While the DC power source 2 is connected to the EXT terminal, the charging circuit 10r receives a DC voltage $V_{DC}$ and charges the secondary battery 20. Further, the charging circuit 10r selects one between the battery voltage $V_{BAT}$ and the DC voltage $V_{DC}$, and outputs a system voltage $V_{SYS}$ via a system terminal SYS.

The power circuit 22 receives the system voltage $V_{SYS}$, and steps up or steps down the system voltage $V_{SYS}$ to generate a supply voltage $V_{DD}$. Then, the power circuit 22 provides the supply voltage $V_{DD}$ to loads, i.e., the CPU 24 and the peripheral circuits 26. The power circuit 22 may include a DC/DC converter, a charge pump circuit, a linear regulator such as an LDO (Low Drop Output) regulator, etc.

The charging circuit 10r includes a first transistor M1, a second transistor M2, an OVP (Over Voltage Protection) circuit 102, a UVLO (Under Voltage Lock Out) circuit 104, a gate controller 120, and a charging controller 122.

At a DC input terminal DCIN, the DC voltage $V_{DC}$ from the DC power source 2 is received. A battery terminal BAT is connected to the secondary battery 20. The first transistor M1 is disposed between the terminal DCIN and the terminal SYS. The first transistor M1 includes two n-channel MOSFETs in anti-series connection.

The second transistor M2 is disposed between the terminal SYS and the terminal BAT. Back gate switches SW11 and SW12 are disposed between a back gate and a first electrode E1 of the second transistor M2, and between the back gate and a second electrode E2 of the second transistor M2, respectively.

While the DC power source 2 is connected to the charging circuit 10r to supply a normal DC voltage $V_{DC}$, the gate controller 120 turns on the first transistor M1. When the first transistor M1 is turned on, the DC voltage $V_{DC}$ is output to the SYS terminal.

The OVP circuit 102 and the UVLO circuit 104 determine whether the DC voltage $V_{DC}$ is normal. The OVP circuit 102 compares the DC voltage $V_{DC}$ with a threshold value $V_{OVP}$ for overvoltage protection, and the UVLO circuit 104 compares the DC voltage $V_{DC}$ with a threshold value $V_{UVLO}$ for low-voltage lock out. The comparison results are input to the gate controller 120.

While a normal DC voltage $V_{DC}$ is being supplied, the charging controller 122 charges the secondary battery 20. In particular, the back gate switch SW11 is turned on and the switch SW12 is turned off. The charging controller 122 adjusts a gate voltage of the second transistor M2, and charges the secondary battery 20 in a CC (constant current) charging mode or a CV (constant voltage) charging mode.

While the DC power source 2 is not connected to the charging circuit 10r and a normal DC voltage $V_{DC}$ is not being supplied to the charging circuit 10r, the back gate switch SW12 is turned on and the back gate switch SW11 is turned off. Further, the charging controller 122 turns the second transistor M2 fully-off. As a result, the battery voltage $V_{BAT}$ is supplied to the power circuit 22 via the SYS terminal.

The charging circuit 10r of FIG. 1 has the following drawbacks. For determining whether the DC power source 2 is connected to the charging circuit 10r or not, a voltage $V_{DCIN}$ of the terminal DCIN is monitored, and it is determined that the DC power source 2 is connected to the charging circuit 10r if the voltage $V_{DCIN}$ is below a predetermined threshold value (e.g., $V_{UVLO}$).

Figure 2:
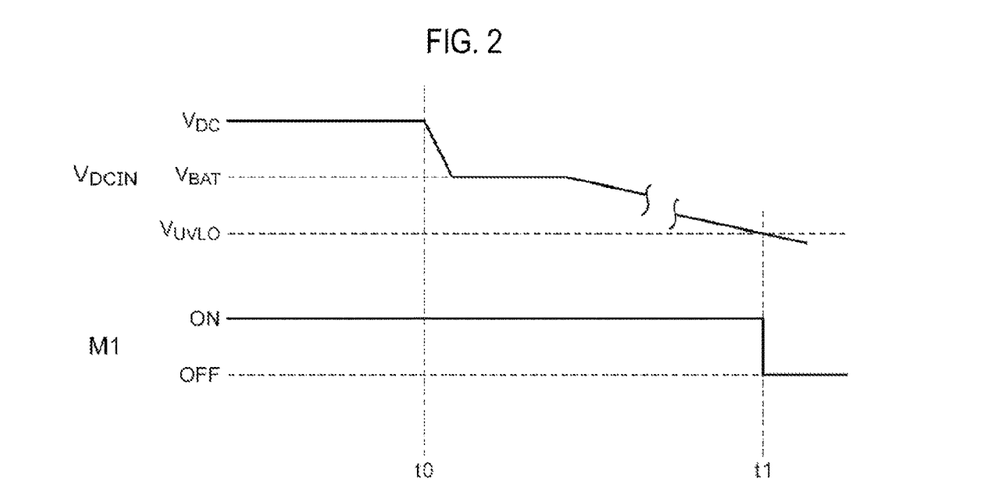
FIG. 2 is a diagram showing operation waveforms of the charging circuit of FIG. 1.

FIG. 2 is a diagram showing operation waveforms of the charging circuit 10r of FIG. 1. In the initial state, the DC power source 2 is connected to the charging circuit 10r to supply the normal DC voltage $V_{DC}$ that meets the relationship $V_{UVLO} < V_{DC} < V_{OVP}$. The first transistor M1 is turned on. In this state, the voltages of both the terminal DCIN and the terminal SYS are equal to the voltage $V_{DC}$ from the DC power source 2.

At t0, the DC power source 2 is disconnected. At this time, the voltage of the SYS terminal decreases to the battery voltage $V_{BAT}$. At this time point, the electric potential of the DCIN terminal does not decrease below the battery voltage $V_{BAT}$ even though the DC power source 2 is disconnected, since the terminal DCIN and the terminal SYS are connected to each other through the first transistor M1 that is in an on-state. That is, since the electric potential of the terminal DCIN does not decrease below the threshold value $V_{UVLO}$, it cannot be immediately detected that the DC power source 2 is disconnected. Thereafter, at t1, the secondary battery 20 is discharged and the battery voltage $V_{BAT}$ decreases to the threshold value $V_{UVLO}$, and it is determined that the DC power source 2 is disconnected to turn off the first transistor M1.

That is, in the charging circuit 10r of FIG. 1, it is necessary to operate the circuitry for monitoring the voltage $V_{DCIN}$ of the terminal DCIN, the charging controller 122, etc. even after the DC power source 2 has been disconnected until the disconnection is detected, i.e., from t0 to t1. Accordingly, the power of the secondary battery 20 is wasted within the charging circuit 10r.

To address this shortcoming, the threshold value $V_{UVLO}$ may be set as a higher value than the typical value of the battery voltage $V_{BAT}$. According to this method, however, when the DC power source 2 has a small current capacity, the DC voltage $V_{DC}$ from the DC power source 2 drops to a lower value than the threshold value $V_{UVLO}$ if a large current $I_{DC}$ flows, causing an erroneous determination that the DC power source 2 is disconnected even though it is connected. Therefore, according to this approach, there is another problem in that it may be erroneously determined that the DC power source 2 is disconnected even though it is connected.

It should be noted that it is not intended hereby to acknowledge the charging circuit 10r as prior art, and that the above-mentioned problems derived therefrom should not be regarded as a general appreciation by those skilled in the art.

The present disclosure provides some embodiments of a charging circuit capable of detecting detachment of a DC power source in a short period of time.

According to one embodiment of the present disclosure, provided is a charging circuit. The charging circuit includes: a DC input terminal configured to receive a DC voltage from a DC power source; a battery terminal connected to a secondary battery; a system terminal; a first transistor disposed between the DC input terminal and the system terminal; a second transistor disposed between the system terminal and the battery terminal; a gate controller configured to control turning on/off of the first transistor; a charging controller configured to control a gate voltage of the second transistor to control charging of the secondary battery; an overcurrent protection circuit configured to compare an input current flowing in the DC input terminal and the first transistor with a threshold current having multiple steps of values, and vary the gate voltage of the first transistor generated by the gate controller such that on-resistance is increased when the input current reaches the threshold current; a low-voltage detection circuit configured to compare a voltage at the DC input terminal with a predetermined threshold voltage, and decrease the threshold current of the overcurrent protection circuit by one step when the voltage of the DC input terminal is below the predetermined threshold voltage; and a DC power detecting unit configured to determine, when the threshold current is at a minimum value and the voltage of the DC input terminal is below the threshold voltage, that the DC power source is not connected to the charging circuit.

According to this embodiment, it is possible to distinguish between a reduction in the voltage of the DC input terminal caused by lack of current capacity of a DC power source, and a reduction in the voltage of the DC input terminal caused by the disconnection of the DC power source. Accordingly, it is possible to accurately detect that the DC power source has been disconnected from the charging circuit.

The predetermined threshold voltage may be set to be lower than the fully charged voltage of the secondary battery.

The charging circuit may further include: a low-voltage lock out circuit configured to compare the voltage of the DC input terminal with a threshold voltage for low-voltage lock out.

The second transistor may be a p-channel transistor, a first electrode of the second transistor may be connected to the system terminal, and a second electrode of the second transistor may be connected to the battery terminal. The second transistor may include a back gate, a first back gate switch disposed between the back gate and the first electrode, and a second back gate switch disposed between the back gate and the second electrode. The charging circuit may further include a back gate controller, the back gate controller being configured to turn the first back gate switch on and the second back gate switch off when a voltage of the system terminal is higher than a voltage at the battery terminal, and to turn the first back gate switch off and the second back gate switch on when the voltage at the system terminal is lower than the voltage of the battery terminal.

The back gate controller may include a comparator configured to compare the voltage of the system terminal with the voltage of the battery terminal.

The charging circuit may further include a comparator controller configured to control an on/off state of the comparator. The comparator controller may turn off the comparator when the DC power detecting unit determines that the DC power source is not connected to the charging circuit and the voltage of the battery terminal is higher than the voltage of the system terminal.

As a result, it is possible to prevent a rush current from flowing through the second transistor and its body diode immediately after the DC power source is disconnected.

According to another embodiment of the present disclosure, provided is a charging circuit. The charging circuit may include: a DC input terminal configured to receive a DC voltage from a DC power source; a battery terminal connected to a secondary battery; a system terminal; a first transistor disposed between the DC input terminal and the system terminal; a second transistor having: a first electrode connected to the system terminal; a second electrode connected to the battery terminal; a back gate; a first back gate switch disposed between the back gate and the first electrode; and a second back gate switch disposed between the back gate and the second electrode; a gate controller configured to control turning on/off of the first transistor; a charging controller configured to control a gate voltage of the second transistor to control charging of the secondary battery; a DC power detecting unit configured to detect whether the DC power source is connected to the charging circuit; a back gate controller having a comparator configured to compare a voltage of the system terminal with a voltage of the battery terminal, the back gate controller being configured to turn the first back gate switch on and the second back gate switch off when the voltage of the system terminal is higher than the voltage of the battery terminal, and to turn the first back gate switch off and the second back gate switch on when the voltage of the system terminal is lower than the voltage of the battery terminal; and a comparator controller configured to turn off the comparator when the DC power detecting unit determines that the DC power source is not connected to the charging circuit and the voltage of the battery terminal is higher than the voltage of the system terminal.

According to this embodiment, it is possible to prevent a rush current from flowing through the second transistor and its body diode immediately after the DC power source is disconnected.

The charging circuit may be integrated within a single semiconductor substrate.

As used herein, the phrase "circuit integrated within a single semiconductor substrate" refers to the fact that all of the circuit elements are formed on a single semiconductor substrate, and that major circuit elements are integrated within the single semiconductor substrate, with some resistors, capacitors and the like used for adjusting circuit constants formed outside the semiconductor substrate.

By integrating the circuit on a single chip, the area of the circuit can be reduced while maintaining the characteristics of the circuit elements.

According to another embodiment of the present disclosure, provided is an electronic device. The electronic device includes: an external power terminal connected to a DC power source; a secondary battery; a processor; the charging circuit of any one of the above-described embodiments; and a power circuit configured to receive the voltage of the system terminal of the charging circuit to provide voltage to at least the processor.

According to another embodiment of the present disclosure, provided is a power management circuit. The power management circuit includes: the charging circuit of any one of the above-described embodiments; a power circuit configured to receive a voltage of the system terminal to generate multiple supply voltages; and a power management controller configured to control the power circuit.

It should be understood that any combinations of the elements described above, as well as the elements and expressions interchangeably used for describing methods, devices, systems and so on, are also construed as aspects of the present disclosure.

DETAILED DESCRIPTION

Various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are provided for the purpose of illustration, not limitation, of the present disclosure, and all features and combinations thereof described in the embodiments should not be necessarily construed as describing the gist of the present disclosure.

As used herein, the phrase "a member A is connected with a member B" means that member A is physically and directly connected with member B, and that member A is connected with member B via another member which does not electrically affect the connection. Similarly, the phrase "a member C is disposed between a member A and a member B" means that member A is directly connected with member C or member B is directly connected with member C, and that the members are indirectly connected via another member which does not electrically affect the connection.

First Embodiment

Figure 3:
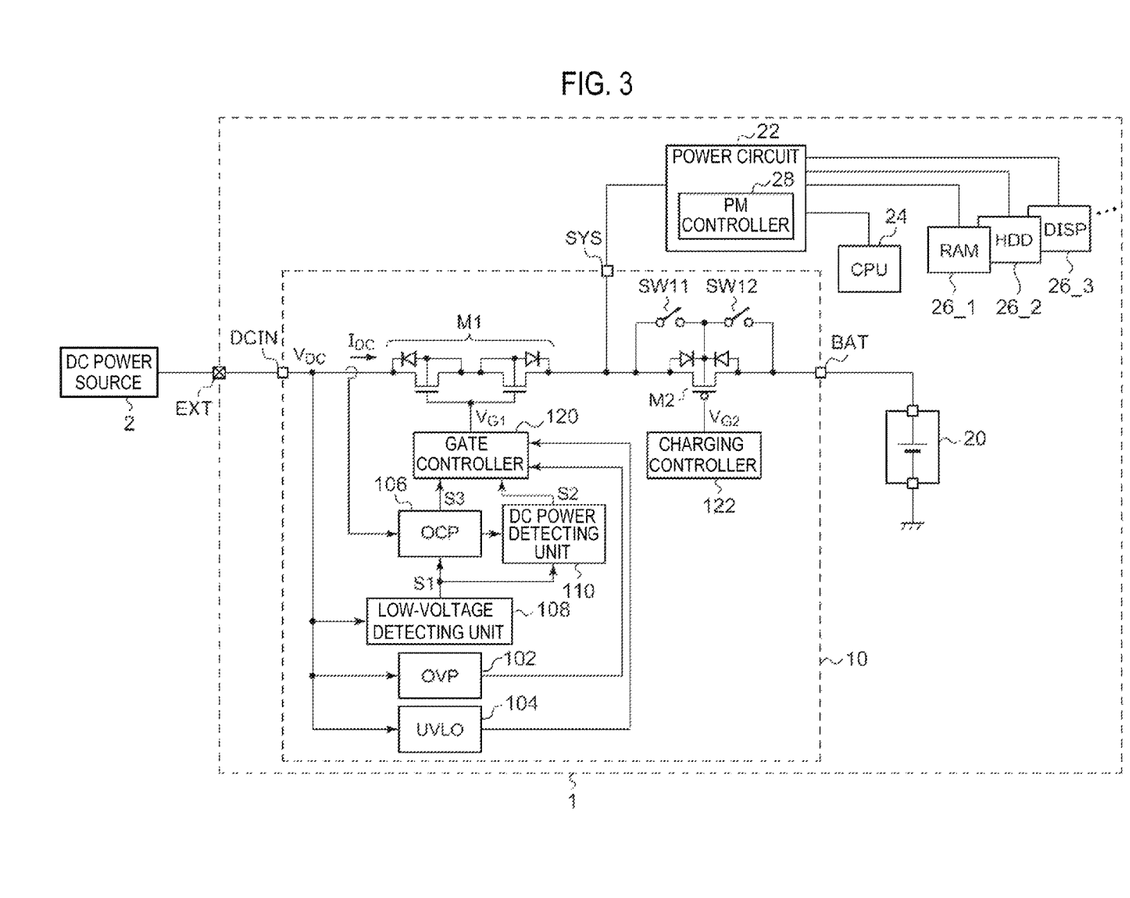
FIG. 3 is a circuit diagram of an electronic device including a charging circuit according to a first embodiment of the present disclosure.

FIG. 3 is a circuit diagram of an electronic device 1 including a charging circuit 10 according to a first embodiment of the present disclosure. The peripheral circuits of the charging circuit 10 are identical to those described above with respect to FIG. 1, and thus, will not be described below.

The charging circuit 10 includes a first transistor M1, a second transistor M2, a gate controller 120, a charging controller 122, an OVP circuit 102, a UVLO circuit 104, an OCP circuit 106, a low-voltage detecting circuit 108, and a DC power detecting unit 110.

At a DCIN terminal of the charging circuit 10, a DC voltage $V_{DC}$ from the DC power source 2 is received. A secondary battery 20 is connected to a BAT terminal, and a power circuit 22 is connected to a SYS terminal.

The power circuit 22 generates multiple supply voltages $V_{DD}$ to supply them to the loads, i.e., the CPU 24 and the peripheral circuits 26. To normally start up and stop the electronic device 1, it is necessary to generate and interrupt the supply voltage $V_{DD}$ for the CPU 24 or the peripheral circuits 26 in a predetermined sequence. Accordingly, a power management (PM) controller 28 may be implemented. The PM controller 28 may be installed within the power circuit 22.

The first transistor M1 is disposed between the DCIN terminal and the SYS terminal. The gate controller 120 controls turning on/off the first transistor M1. The gate controller 120 may turn the first transistor M1 fully-on while a normal DC voltage $V_{AC}$ is being supplied, i.e., during a time period when the first transistor M1 is to be turned on.

Alternatively, the gate controller 120 may be configured to adjust a gate voltage $V_{G1}$ of the first transistor M1 so that a voltage $V_{SYS}$ of the SYS terminal (system voltage) gets close to a target voltage. That is, the gate controller 120 and the first transistor M1 may be a linear regulator.

The second transistor M2 is disposed between the SYS terminal and the BAT terminal. The charging controller 122 controls a gate voltage $V_{G2}$ of the second transistor M2 to control charging of the secondary battery 20.

The OCP circuit 106 compares an input current flowing though the DCIN terminal and the first transistor M1 with a threshold current $I_{OCP}$ having multiple steps of values. Further, the OCP circuit 106 determines that it is in an overcurrent state if the input current $I_{DC}$ reaches the threshold current $I_{OCP}$. Once the OCP determines that it is in an overcurrent state, the gate voltage $V_{G1}$ of the first transistor M1 generated by the gate controller 120 is varied such that its on-resistance is increased. That is, in the normal state, in order to turn the first transistor M1 fully-on, the gate voltage $V_{G1}$ is set as a maximum value. If an overcurrent state is detected, the gate voltage $V_{G1}$ is decreased, and the on-resistance of the first transistor M1 is increased such that the input current $I_{DC}$ decreases.

The low-voltage detecting circuit 108 compares the voltage $V_{DCIN}$ of the DCIN terminal with a predetermined threshold voltage $V_{LOW}$, and asserts a low-voltage detection signal S1 (e.g., high level signal) if the voltage $V_{DCIN}$ of the DCIN terminal is lower than the threshold voltage $V_{LOW}$. Upon receiving the low-voltage detection signal S1, the OCP circuit 106 decreases the threshold current $I_{OCP}$ by one step. The threshold voltage $V_{LOW}$ is set to be lower than the fully charged voltage $V_{FILL}$ of the secondary battery 20.

While the threshold current $I_{OCP}$ is decreased to the minimum value MIN, the DC power detecting unit 110 determines that the DC power source 2 is disconnected if the voltage $V_{DCIN}$ of the DCIN terminal is lower than the threshold voltage $V_{LOW}$.

The OVP circuit 102 compares the voltage $V_{DCIN}$ of the DCIN terminal with a threshold voltage $V_{OVP}$ for over voltage protection. If an over voltage state is detected (i.e., $V_{DC} > V_{OVP}$), the gate controller 120 turns off the first transistor M1.

The UVLO circuit 104 compares the voltage $V_{DCIN}$ of the DCIN terminal with a threshold voltage $V_{UVLO}$ for low-voltage lock out. If a low-voltage lock out state is detected (i.e., $V_{DC} < V_{UVLO}$), the gate controller 120 turns off the first transistor M1.

The configuration of the charging circuit 10 has been described in detail above. The operation of the charging circuit will be described in detail with respect to (i) a scenario where the DC power source 2 is disconnected, and (ii) a scenario where the a DC power source with small current capacity is connected.

(i) Scenario where DC Power Source 2 is Disconnected

Figure 4:
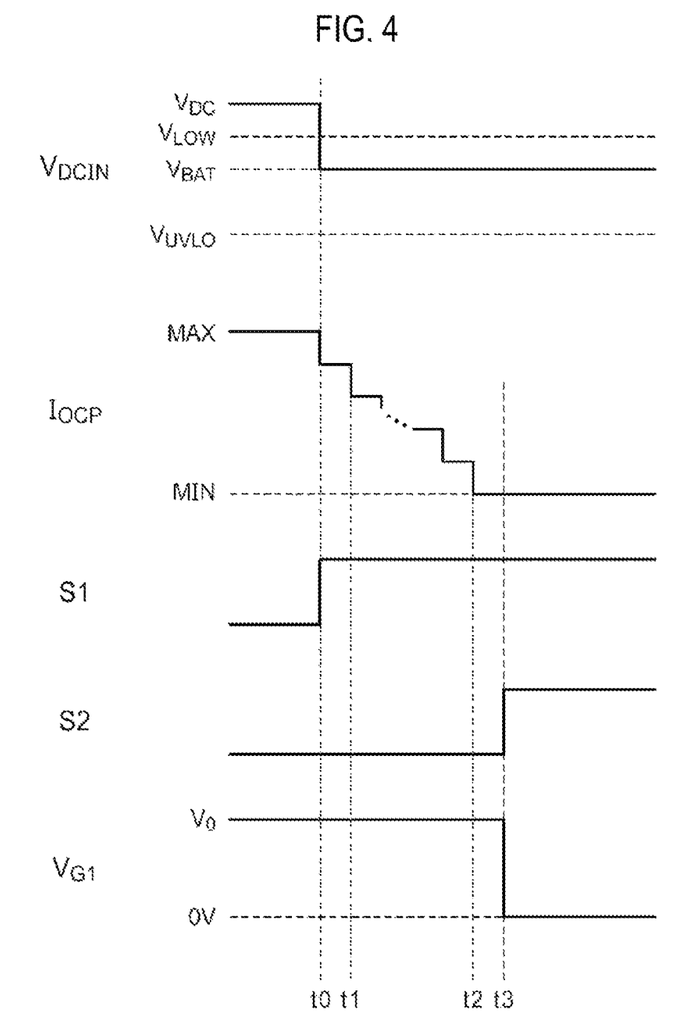
FIG. 4 is a diagram showing operation waveforms of the charging circuit of FIG. 3 when a DC power source is disconnected from the charging circuit, according to one embodiment of the present disclosure.

FIG. 4 is a diagram showing operation waveforms of the charging circuit 10 of FIG. 3 when the DC power source 2 is disconnected from the charging circuit 10, according to one embodiment of the present disclosure. In the initial state, the DC power source 2 is connected to the charging circuit 10 so as to supply a normal DC voltage $V_{DC}$ that meets the relationship $V_{UVLO} < V_{DC} < V_{OVP}$. In this state, the gate controller 120 generates a gate voltage $V_{G1}$ (=V0) that can turn the first transistor M1 fully-on. In this state, the voltages of both the terminal DCIN and the terminal SYS are equal to the voltage $V_{DC}$ from the DC power source 2.

At t0, the DC power source 2 is disconnected from the charging circuit 10. At this time, the voltage of the SYS terminal decreases to the battery voltage $V_{BAT}$. At this time point, the electric potential of the DCIN terminal decreases to the battery voltage $V_{BAT}$, because the DCIN terminal and the SYS terminal are connected to each other through the first transistor M1 that is in an on-state.

Since the voltage $V_{DCIN}$ of the DCIN terminal becomes lower than the threshold voltage $V_{LOW}$, a low-voltage detection signal S1 is asserted by the low-voltage detecting circuit 108. When the low-voltage detection signal S1 is asserted, the OCP circuit 106 decreases the overcurrent threshold $I_{OCP}$ by one step from its initial value (the maximum value MAX).

When the DC power source 2 is disconnected, the input current $I_{DC}$ becomes substantially zero. Accordingly, the input current $I_{DC}$ is smaller than the overcurrent threshold $I_{OCP}$ ($I_{DC} < I_{OCP}$), and the overcurrent protection is not activated. That is, the gate voltage $V_{G1}$ generated by the gate controller 120 remains at the maximum value, and the first transistor M1 is kept fully-on.

At t1, the voltage $V_{DCIN}$ of the DCIN terminal is lower than the threshold voltage $V_{LOW}$, and thus, the low-voltage detection signal S1 remains at a high level. Further, the threshold current $I_{OCP}$ of the OCP circuit 106 is decreased by one more step. By repeating these steps, the threshold current $I_{OCP}$ decreases to the minimum value (at t2).

While the threshold current $I_{OCP}$ is decreased to the minimum value MIN, the DC power detecting unit 110 determines that the DC power source 2 is disconnected if the voltage $V_{DCIN}$ of the DCIN terminal is lower than the threshold voltage $V_{LOW}$ and asserts a disconnection detection signal S2. When the disconnection detection signal S2 is asserted, the gate controller 120 decreases the gate voltage $V_{G1}$ of the first transistor M1 and turns off the first transistor M1.

(ii) Scenario where DC Power Source 2 with Small Current Capacity is Connected

Figure 5:
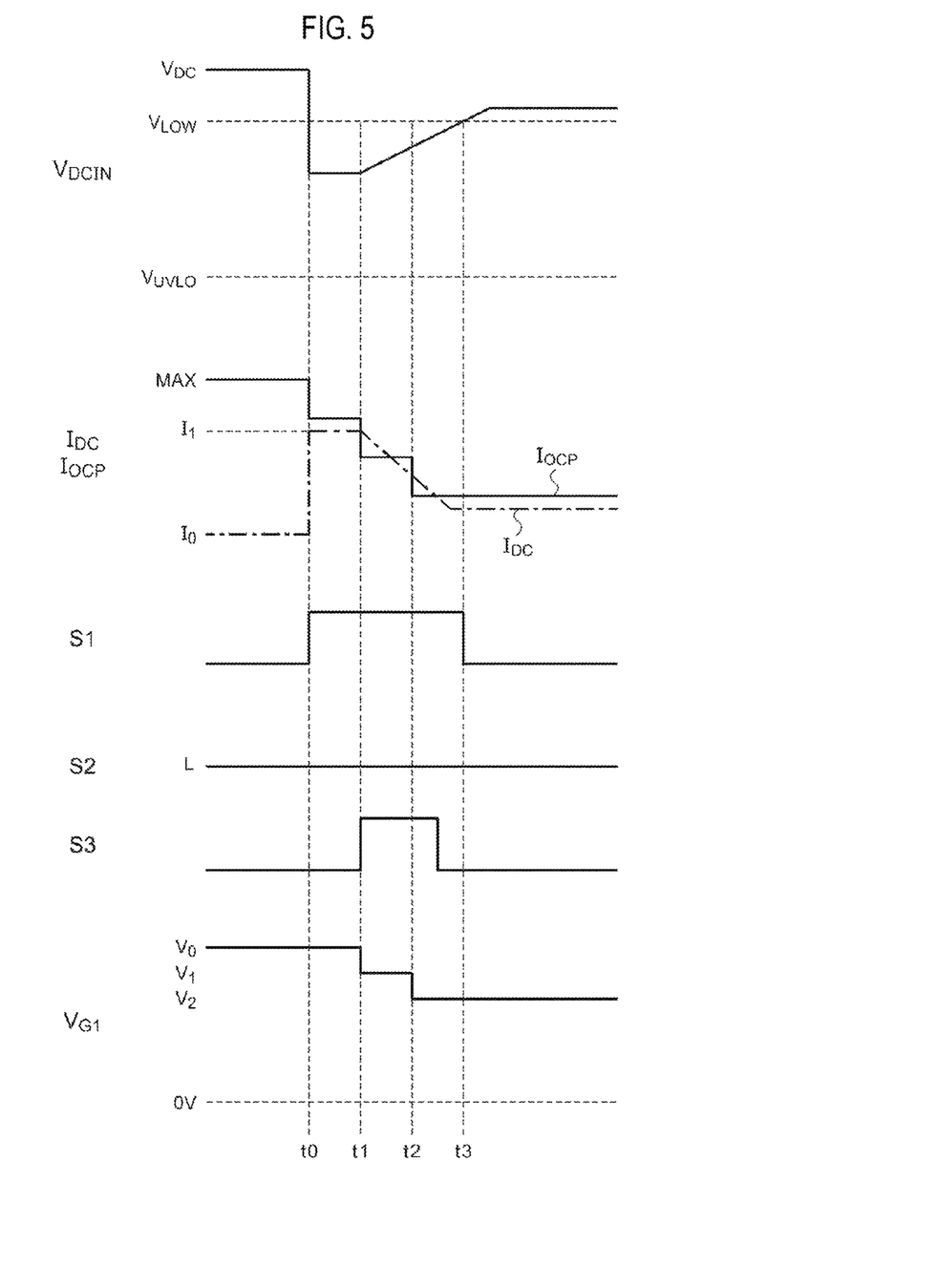
FIG. 5 is a diagram showing operation waveforms of the charging circuit of FIG. 3 when the DC power source with small current capacity is connected to the charging circuit, according to one embodiment of the present disclosure.

FIG. 5 is a diagram showing operation waveforms of the charging circuit 10 of FIG. 3 when the DC power source 2 with small current capacity is connected to the charging circuit 10, according to one embodiment of the present disclosure.

In the initial state, a DC power source 2 is connected to the charging circuit 10. The input current $I_{DC}$ is a current I0 that is smaller than the current capacity of the DC power source 2, and a normal DC voltage $V_{DC}$ that meets the relationship $V_{UVLO} < V_{DC} < V_{OVP}$ is being supplied. In this state, the gate controller 120 generates a gate voltage $V_{G1}$ (=V0) that can turn the first transistor M1 fully-on. The voltages of both the DCIN terminal and the SYS terminal are equal to the voltage $V_{DC}$ from the DC power source 2.

At t0, a load current of the DC power source 2, i.e., the input current $I_{DC}$ is increased, and the DC voltage $V_{DC}$ drops if the input current $I_{DC}$ exceeds the current capacity of the DC power source 2. If the voltage $V_{DCIN}$ of the DCIN terminal becomes lower than the threshold voltage $V_{LOW}$, a low-voltage detection signal S1 is asserted by the low-voltage detecting circuit 108. When the low-voltage detection signal S1 is asserted, the OCP circuit 106 decreases the overcurrent threshold $I_{OCP}$ from its initial value (maximum value MAX) by one step.

At t1, the voltage $V_{DCIN}$ of the DCIN terminal is lower than the threshold voltage $V_{LOW}$, and thus, the low-voltage detection signal S1 keeps being asserted. Accordingly, the OCP circuit 106 further decreases the overcurrent threshold current $I_{OCP}$ by one step.

If the overcurrent threshold $I_{OCP}$ decreases at t1, the input current $I_{DC}$ exceeds the overcurrent threshold $I_{OCP}$ and the overcurrent detection signal S3 is asserted. When the overcurrent detection signal S3 is asserted, the gate controller 120 decreases the gate voltage $V_{G1}$ of the first transistor M1 such that the on-resistance of the first transistor M1 is increased. Accordingly, current limitation is imposed and thus the input current $I_{DC}$ decreases. As the input current $I_{DC}$ decreases, the DC voltage $V_{DC}$ slightly increases.

At t2, the voltage $V_{DCIN}$ of the DCIN terminal is still below the threshold voltage $V_{LOW}$. Accordingly, the low-voltage detection signal S1 keeps being asserted, and the overcurrent threshold $I_{OCP}$ is further deceased by one step. At this time, since the input current $I_{DC}$ is larger than the overcurrent threshold $I_{OCP}$, the overcurrent detection signal S3 keeps being asserted. Thus, the gate voltage $V_{G1}$ of the first transistor M1 further decreases, and a stronger current limitation is imposed.

As a result of the current limitation, the input current $I_{DC}$ decreases and the voltage $V_{DCIN}$ of the DCIN terminal is further increased. When the voltage $V_{DCIN}$ of the DCIN terminal exceeds the threshold $V_{LOW}$ at t3, the low-voltage detection signal S1 is negated. At this time, since the input current $I_{DC}$ is smaller than the overcurrent threshold $I_{OCP}$, the overcurrent detection signal S3 is negated and the overcurrent threshold $I_{OCP}$ does not reach the minimum value MIN. Thus, the disconnection detection signal S2 is not asserted.

The operations of the charging circuit 10 have been described above.

According to the charging circuit 10, as described above with respect to FIG. 4, it is possible to accurately detect that the DC power source 2 has been disconnected in a short period of time, without having to wait until the secondary battery 20 is discharged. Additionally, it is possible to the prevent waste of power of the secondary battery 20 by interrupting the charging controller 122, the low-voltage detecting circuit 108, the DC power detecting unit 110, the OCP circuit 106, etc. immediately after detecting that the DC power source 2 is disconnected.

In addition, it is possible to distinguish between a reduction in the voltage $V_{DCIN}$ of the DCIN terminal caused by the disconnection of the DC power source 2 and a reduction in the voltage $V_{DCIN}$ of the DCIN terminal caused by a drop in the DC voltage $V_{DC}$ resulting from an increase in the input current $I_{DC}$. As a result, stable operation of the circuit is ensured.

Second Embodiment

In the second embodiment, a charging circuit 10 will be described that can be used in combination with or independently from the first embodiment.

As described above, the charging circuit 10 controls turning on/off of the first transistor M1 and the second transistor M2, and the back gate switches SW11 and SW12 of the second transistor M2 based on whether the DC power source 2 is connected to the charging circuit 10 or not. In the second embodiment, problems associated with such control are solved.

Figure 6:
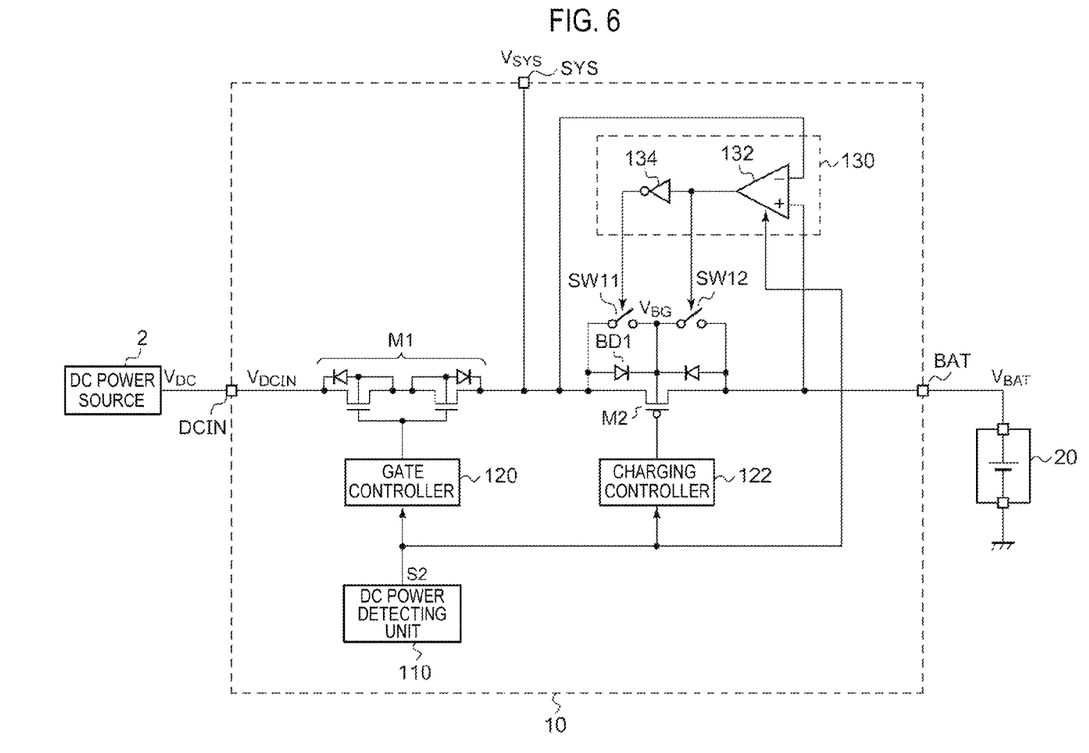
FIG. 6 is a diagram illustrating basic operations of a charging circuit according to one embodiment of the present disclosure.

Initially, problems that may occur in the charging circuit 10 will be described with reference to FIG. 6. FIG. 6 is a diagram for illustrating basic operations of the charging circuit 10 according to one embodiment of the present disclosure.

The DC power detecting unit 110 detects whether the DC power source 2 is connected to the charging circuit 10 or not. A result of the detection is sent to the gate controller 120, the charging controller 122, and the back gate controller 130. The operations of the gate controller 120, the charging controller 122, and the back gate controller 130 will be described in detail below.

(1) When DC Power Source 2 is Connected

The gate controller 120 turns on the first transistor M1. The charging controller 122 adjusts the gate voltage of the second transistor M2 and charges the secondary battery 20 with the voltage $V_{DC}$ from the DC power source 2. The back gate controller 130 turns on/off the back gate switches SW11 and SW12 based on the values of the system voltage $V_{SYS}$ and the battery voltage $V_{BAT}$. When the system voltage $V_{SYS}$ is higher than the battery voltage $V_{BAT}$, the back gate controller 130 turns on the first back gate switch SW11 and turns off the second back gate switch SW12. When the system voltage $V_{SYS}$ is lower than the battery voltage $V_{BAT}$, the back gate controller 130 turns off the first back gate switch SW11 and turns on the second back gate switch SW12.

(2) When DC Power Source 2 is not Connected

The gate controller 120 turns off the first transistor M1. The charging controller 122 turns the second transistor M2 fully-on, referenced to the gate voltage of the second transistor M2 as ground potential (0 V). The back gate controller 130 turns off the back gate switch SW11 and turns on the back gate switch SW12.

This operation may be achieved by turning off the DC power detecting unit 110, the charging controller 122, and a comparator 132 upon detecting that the DC power source 2 has been disconnected.

By turning the comparator 132 off, its output becomes a low level (ground potential). At this time, the back gate switch SW12 is a p-channel MOSFET and is turned on. At the gate of the back gate switch SW11, which is a p-channel MOSFET, a voltage of high level is received from an inverter 134, and the back gate switch SW11 is turned off.

In addition, as the charging controller 122 is turned off, its output, i.e., the gate voltage of the second transistor M2, becomes ground voltage (0 V). As the back gate of the second transistor M2 is connected to the BAT terminal, the second transistor M2 is turned fully-on.

The basic operations of the charging circuit 10 have been described in detail. In this configuration, when the DC power source 2 is not connected, it is possible to prevent waste of power of the secondary battery 20 by turning off the DC power detecting unit 110, the charging controller 122, and the back gate controller 130. As a result, the lifespan of the secondary battery 20 may be prolonged. This charging circuit 10, however, suffers from the following problem.

Let us assume that the DC power source 2 is disconnected when the secondary battery 20 is deeply discharged, i.e., the voltage $V_{BAT}$ of the secondary battery 20 is low. If the second transistor M2 is turned fully-on while the system voltage $V_{SYS}$ is higher than the battery voltage $V_{BAT}$, a rush current $I_{RUSH}$ flows from the SYS terminal to the BAT terminal. Also at this time, since the back gate of the second transistor M2 is connected to the BAT terminal, an overcurrent also flows through a body diode BD1 of the second transistor M2.

Thus, in order to ensure reliability even when an overcurrent flows, it is necessary to design the transistors in a large size and make the width of a line connected to the body diode BD1 sufficiently wide, which causes the area of the circuit to be large.

An object of the second embodiment is to solve the above problem, i.e., to provide a charging circuit 10 capable of suppressing a rush current when the DC power source 2 is disconnected.

Figure 7:
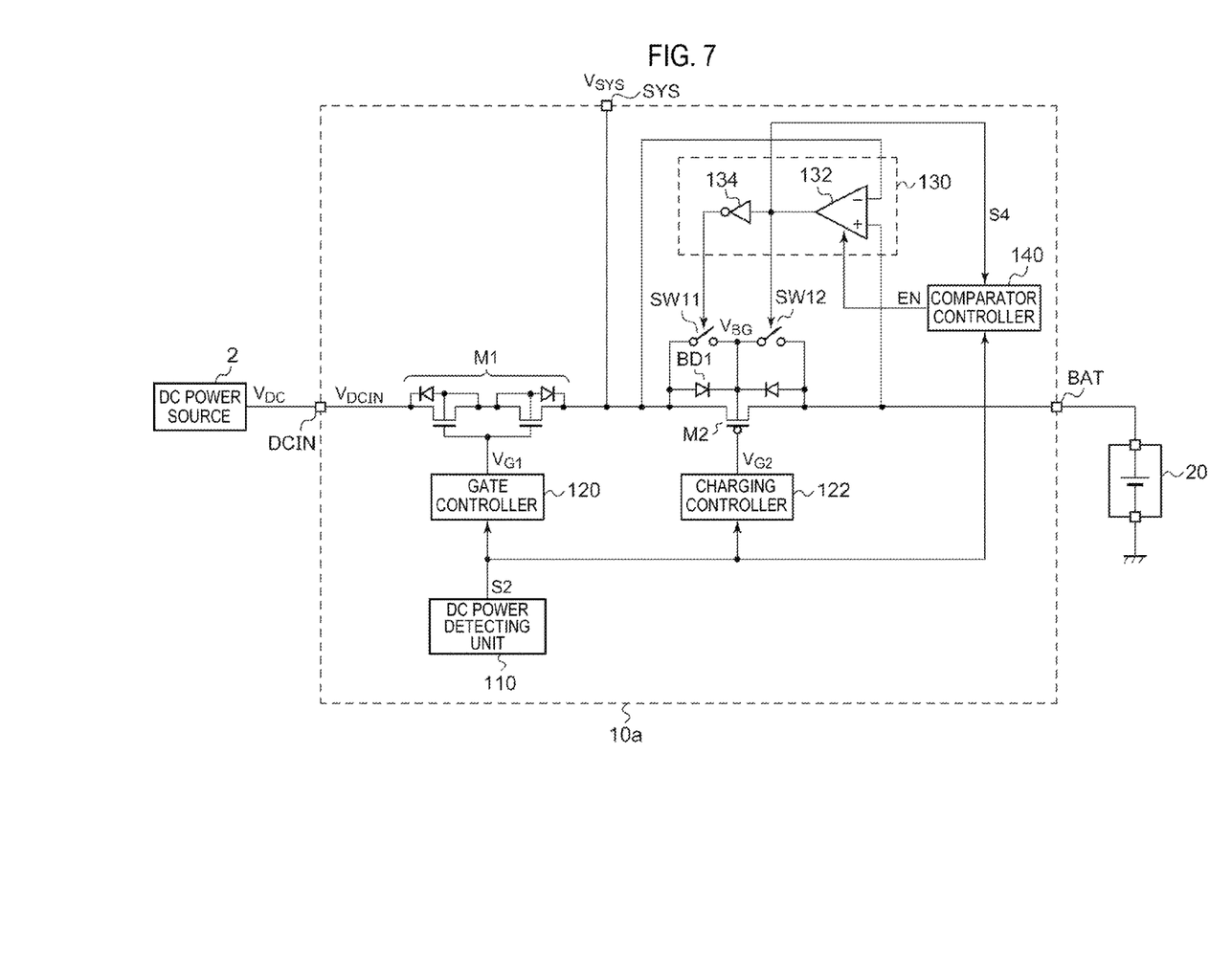
FIG. 7 is a circuit diagram of a charging circuit according to a second embodiment of the present disclosure.

FIG. 7 is a circuit diagram of the charging circuit 10a according to the second embodiment of the present disclosure. The charging circuit 10a further includes a comparator controller 140 in addition to the elements of the charging circuit 10 of FIG. 6.

The gate controller 120 and the charging controller 122 are turned off when the disconnection detection signal S2 is asserted, which indicates that the DC power detecting unit 110 detected disconnection of the DC power source 2. This is similarly carried out as explained with reference to FIG. 6.

The comparator controller 140 receives the disconnection detection signal S2 and a signal (comparison signal) S4 indicative of a comparison result by the back gate controller 130, and controls turning on/off of the comparator 132 in response to the signals. The comparator 132 is turned on/off in response to an enable signal EN. For example, the comparator 132 is turned on when the enable signal EN is a high level signal and is turned off when the enable signal EN is a low level signal.

The comparator controller 140 turns off the comparator 132 when the disconnection detection signal S2 is asserted and the comparison signal S4 indicates that the system voltage $V_{SYS}$ is lower than the battery voltage $V_{BAT}$. That is, the comparator controller 140 does not turn off the comparator 132 immediately after the disconnection detection signal S2 is asserted, but keeps the comparator 132 operating while the system voltage $V_{SYS}$ is higher than the battery voltage $V_{BAT}$.

Figure 8A:
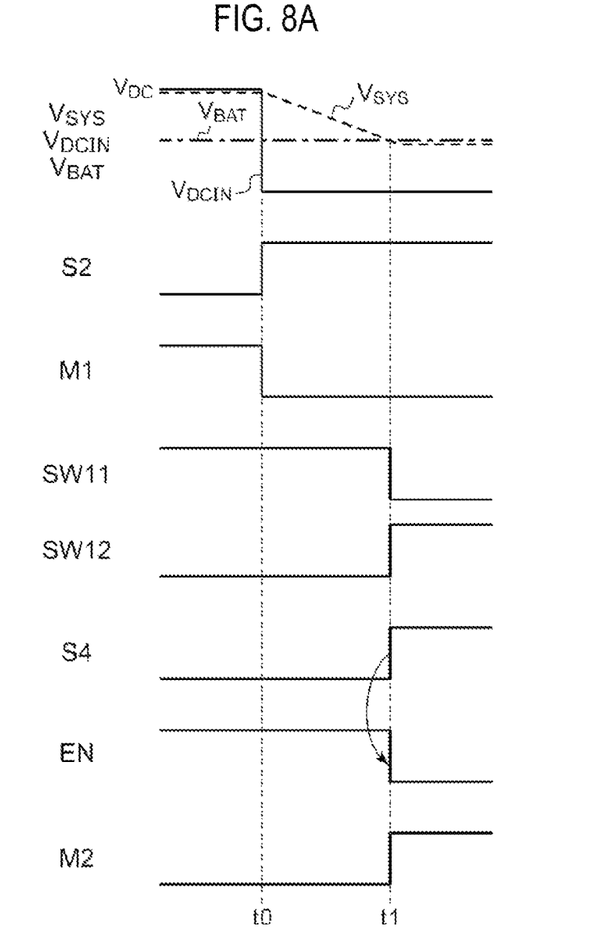
FIG. 8A is a diagram showing operation waveforms of the charging circuit of FIG. 7 according to one embodiment of the present disclosure.
Figure 8B:
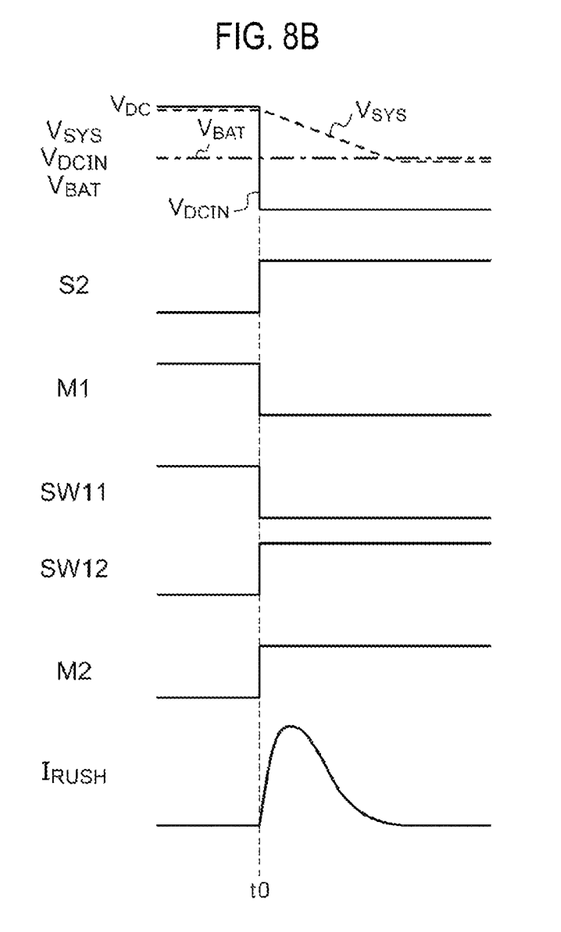
FIG. 8B is a diagram showing operation waveforms of the charging circuit of FIG. 6 according to one embodiment of the present disclosure.

The configuration of the charging circuit 10a has been described in detail above and the operation of the charging circuit 10a will be described in detail below. FIG. 8A is a diagram showing operation waveforms of the charging circuit 10a of FIG. 7; and FIG. 8B is a diagram showing operation waveforms of the charging circuit 10 of FIG. 6. When signals for transistors and switches are in a low level state, the transistors and the switches are in an off-state, and when the signals are in a high level state, the transistors and the switches are in an on-state. To emphasize advantages of the charging circuit 10a, the operation of the charging circuit 10 of FIG. 6 will be described again with reference to FIG. 8B.

Prior to t0, the DC power source 2 is connected to the charging circuit 10. Since $V_{DC} \approx V_{SYS} > V_{BAT}$, the back gate switch SW11 is turned on and the back gate switch SW12 is turned off by the back gate controller 130. The second transistor M2 is turned off, or the gate voltage is adjusted to charge the secondary battery 20.

At t0, the DC power source 2 is disconnected. Immediately after a disconnection detection signal S2 is asserted, the first transistor M1 is turned off, and the gate voltage $V_{G2}$ of the second transistor M2 becomes ground voltage. Further, as the comparator 132 is interrupted, the back gate switch SW11 is turned off and the switch SW12 is turned on. As a result, the second transistor M2 is turned fully-on, and a rush current $I_{RUSH}$ is generated.

Next, the operations of the charging circuit 10a of FIG. 7 is described below with reference to FIG. 8A.

Prior to t0, the waveforms are identical to those of FIG. 8B. When the disconnection detection signal S2 is asserted at time t0, the first transistor M1 is turned off. While the comparison signal S4 is in a low level state, which indicates that the system voltage $V_{SYS}$ is higher than the battery voltage $V_{BAT}$, the second transistor M2 is not immediately turned fully-on but remains in the previous state.

Since the comparison signal S4 is in a low level state, which indicates that the system voltage $V_{SYS}$ is higher than the battery voltage $V_{BAT}$, an enable signal EN remains at a high level (asserted). Accordingly, the comparator 132 of the back gate controller 130 keeps operating, and the back gate switch SW11 is turned on and the back gate switch SW12 is turned off during t0 to t1 where the system voltage $V_{SYS}$ is higher than the battery voltage $V_{BAT}$.

At t1, the system voltage $V_{SYS}$ becomes lower than the battery voltage $V_{BAT}$. The back gate controller 130 turns off the back gate switch SW11 and turns on the back gate switch SW12. In addition, the gate voltage $V_{G2}$ of the second transistor M2 becomes ground voltage, and the second transistor M2 is turned fully-on.

At t1, the comparison signal S4 is transitioned to a high level state, which indicates that the system voltage $V_{SYS}$ is lower than the battery voltage $V_{BAT}$, and the enable signal EN becomes a low level (negated), and the comparator 132 is interrupted.

The operations of the charging circuit 10a have been described in detail above. According to the charging circuit 10a, by employing the comparator controller 140, the back gate control based on voltage comparison, which is the functionality of the back gate controller 130, is performed while the system voltage $V_{SYS}$ is higher than the battery voltage $V_{BAT}$, even after the DC power source 2 is disconnected. Accordingly, a rush current can be suppressed.

In addition, when the system voltage $V_{SYS}$ is lower than the battery voltage $V_{BAT}$ so that there is no concern of a rush current, the comparator 132 may be turned off. By doing so, power consumption may be suppressed to a level similar as in FIG. 6.

The present disclosure has been described with reference to the exemplary embodiments. It should be understood by those skilled in the art that the above embodiments are merely examples, and a variety of modifications may be made to combinations of the elements and processes disclosed herein, and that such modifications also fall within the scope of the present disclosure. Hereinafter, such modifications are described.

(First Modification)

In the second embodiment, the DC power detecting unit 110 of FIG. 7 may employ the DC power source disconnection detection technique described in the first embodiment, i.e., the DC power detecting unit 110 may employ the combination of the low-voltage detecting circuit 108, the OCP circuit 106, and the DC power detecting unit 110 may be employed. Alternatively, as described above with respect to FIG. 1, disconnection of the DC power source 2 may be detected based on a result of comparing the voltage $V_{DCIN}$ of the DCIN terminal with the threshold voltage $V_{UVLO}$.

(Second Modification)

In the above-described embodiments, the charging circuit 10 and the power circuit 22 have been described as separate ICs. However, they may be integrated as a single component. Further, to normally start up and stop the electronic device 1, it is necessary to generate and interrupt the supply voltage $V_{DD}$ for the CPU 24 and the peripheral circuits 26 in a predetermined sequence. To this end, a power management (PM) controller is often installed. In this case, the charging circuit 10, the power circuit 22, and the power management (PM) controller may be integrated as a single IC (also known as a PMIC).

(Applications)

Figure 9:
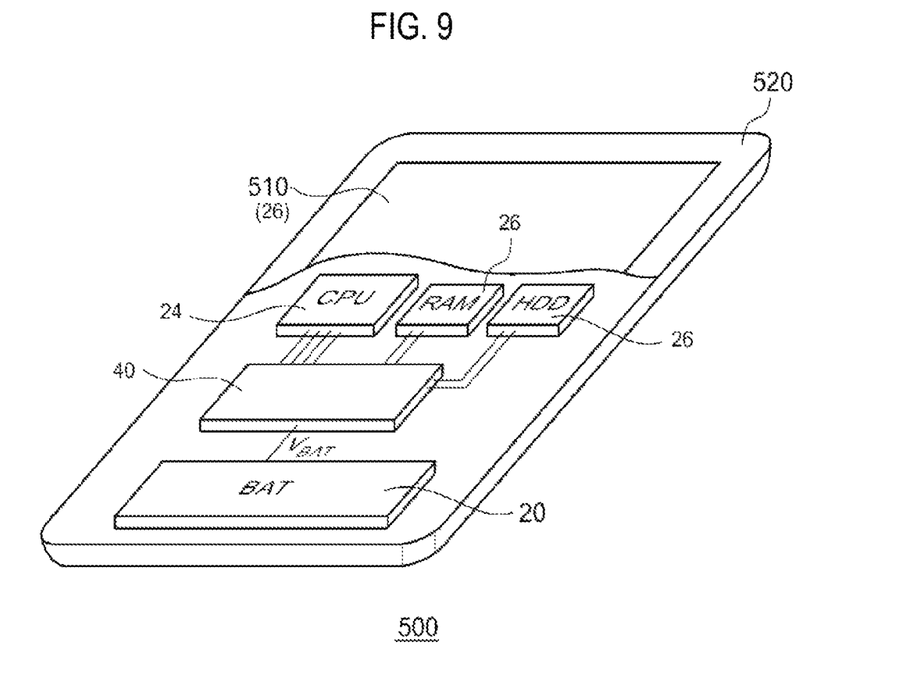
FIG. 9 is a perspective view of an electronic device including a power management IC, according to one embodiment of the present disclosure.

Lastly, applications of the charging circuit 10 will be described. FIG. 9 is a perspective view of an electronic device 500 including a PMIC 40. The electronic device 500, for example, may be a tablet terminal or a smart phone. In the housing 520, peripheral circuits 26 such as a CPU 24, a RAM, a HDD, etc., a secondary battery 20, and the PMIC 40 are accommodated. The PMIC 40 may provide power supply voltage to a display panel 510, its driver, an audio circuit, etc., in addition to the CPU 24, the RAM, and the HDD. The electronic device 500 may also be a laptop, a console game device, a portable game device, a wearable PC, a portable audio player, a digital camera, etc. Instead of using the PMIC 40, the charging circuit 10 and the power circuit 22 may be installed as separate components.

According to embodiments of the present disclosure, disconnection of a DC power source can be detected in a short period of time.

While certain embodiments have been described, these embodiments have been presented by way of example only, and are not intended to limit the scope of the disclosures. Indeed, the methods and apparatus described herein may be embodied in a variety of other forms; furthermore, various omissions, substitutions, and changes in the form of the embodiments described herein may be made without departing from the present disclosure. The accompanying claims and their equivalents are intended to cover such forms or modifications as would fall within the scope of the present disclosure.

What is claimed is:

1. A charging circuit comprising:
   a DC input terminal configured to receive a DC voltage from a DC power source;
   a battery terminal connected to a secondary battery;
   a system terminal;
   a first transistor disposed between the DC input terminal and the system terminal;
   a second transistor disposed between the system terminal and the battery terminal;
   a gate controller configured to control turning on/off of the first transistor;
   a charging controller configured to control a gate voltage of the second transistor to control charging of the secondary battery;
   an overcurrent protection circuit configured to compare an input current flowing in the DC input terminal and the first transistor with a threshold current having multiple steps of values, and vary the gate voltage of the first transistor generated by the gate controller such that on-resistance is increased and the input current is decreased to increase a voltage of the DC input terminal when the input current reaches the threshold current;
   a low-voltage detection circuit configured to:
      compare a voltage at the DC input terminal with a predetermined threshold voltage that is set to be higher than a battery voltage of the battery terminal; and
      repeatedly decrease the threshold current of the overcurrent protection circuit-stepwisely until the threshold current reaches a minimum threshold current, after the voltage of the DC input terminal reaches the battery voltage and before the voltage of the DC input terminal reaches an undervoltage-lockout voltage, which is lower than the battery voltage; and
   a DC power detecting unit configured to determine, when the threshold current is at a minimum value by repeatedly decreasing the threshold current by the low-voltage detection circuit and the voltage of the DC input terminal is below the predetermined threshold voltage, that the DC power source is not connected to the charging circuit, and assert a disconnection detection signal to the gate controller in order to turn off the first transistor.

2. The charging circuit of claim 1, wherein the predetermined threshold voltage is set to be lower than a fully charged voltage of the secondary battery.

3. The charging circuit of claim 1, further comprising: a low-voltage lock out circuit configured to compare the voltage of the DC input terminal with a threshold voltage for low-voltage lock out.

4. The charging circuit of claim 1, wherein the second transistor is a p-channel transistor, a first electrode of the second transistor is connected to the system terminal, a second electrode of the second transistor is connected to the battery terminal,
   wherein the second transistor comprises a back gate, a first back gate switch disposed between the back gate and the first electrode, and a second back gate switch disposed between the back gate and the second electrode, and
   wherein the charging circuit further comprises a back gate controller, the back gate controller is configured to:
      turn the first back gate switch on and the second back gate switch off when a voltage of the system terminal is higher than a voltage of the battery terminal, and
      turn the first back gate switch off and the second back gate switch on when the voltage at the system terminal is lower than the voltage of the battery terminal.

5. The charging circuit of claim 4, wherein the back gate controller comprises a comparator configured to compare the voltage of the system terminal with the voltage of the battery terminal.

6. The charging circuit of claim 5, further comprising:
   a comparator controller configured to control an on/off state of the comparator,
   wherein the comparator controller turns off the comparator when the DC power detecting unit determines that the DC power source is not connected to the charging circuit and the voltage of the battery terminal is higher than the voltage of the system terminal.

7. The charging circuit of claim 1, wherein the charging circuit is integrated within a single semiconductor substrate.

8. An electronic device comprising:
   an external power terminal connected to a DC power source;
   a secondary battery;
   a processor;
   the charging circuit of claim 1; and
   a power circuit configured to receive a voltage of the system terminal of the charging circuit to provide a supply voltage to at least the processor.

9. A power management circuit comprising:
   the charging circuit of claim 1;
   a power circuit configured to receive a voltage of the system terminal to generate multiple supply voltages; and
   a power management controller configured to control the power circuit.

10. A charging circuit comprising:
    a DC input terminal configured to receive a DC voltage from a DC power source;
    a battery terminal connected to a secondary battery;
    a system terminal;
    a first transistor disposed between the DC input terminal and the system terminal;
    a second transistor comprising:
       a first electrode connected to the system terminal;
       a second electrode connected to the battery terminal;
       a back gate;
       a first back gate switch disposed between the back gate and the first electrode; and
       a second back gate switch disposed between the back gate and the second electrode;
    a gate controller configured to control turning on/off of the first transistor;
    a charging controller configured to control a gate voltage of the second transistor to control charging of the secondary battery;
    a DC power detecting unit configured to detect whether the DC power source is connected to the charging circuit;
    a back gate controller comprising a comparator configured to compare a voltage of the system terminal with a voltage of the battery terminal, the back gate controller is configured to turn the first back gate switch on and the second back gate switch off when the voltage of the system terminal is higher than the voltage of the battery terminal, and turn the first back gate switch off and the second back gate switch on when the voltage of the system terminal is lower than the voltage of the battery terminal; and a comparator controller configured to turn off the comparator when the DC power detecting unit determines that the DC power source is not connected to the charging circuit and the voltage of the battery terminal is higher than the voltage of the system terminal.

11. The charging circuit of claim 10, wherein the charging circuit is integrated within a single semiconductor substrate.

12. An electronic device comprising:

an external power terminal connected to a DC power source;

a secondary battery;

a processor;

the charging circuit of claim 10; and a power circuit configured to receive the voltage of the system terminal of the charging circuit to provide a supply voltage to at least the processor.

* * * * *